(12) United States Patent
Xiao et al.

(10) Patent No.: US 10,189,113 B2
(45) Date of Patent: *Jan. 29, 2019

(54) RESISTANCE SPOT WELDING METHOD

(71) Applicant: GM GLOBAL TECHNOLOGY OPERATIONS LLC, Detroit, MI (US)

(72) Inventors: Guoxian Xiao, Troy, MI (US); Pei-Chung Wang, Troy, MI (US); Jorge F. Arinez, Rochester Hills, MI (US); Joseph Clifford Simmer, Richmond, MI (US)

(73) Assignee: GM Global Technology Operations LLC, Detroit, MI (US)

(*) Notice: Subject to any disclaimer, the term of this patent is extended or adjusted under 35 U.S.C. 154(b) by 462 days.

This patent is subject to a terminal disclaimer.

(21) Appl. No.: 14/690,888

(22) Filed: Apr. 20, 2015

(65) Prior Publication Data
US 2015/0306697 A1    Oct. 29, 2015

Related U.S. Application Data

(60) Provisional application No. 61/983,655, filed on Apr. 24, 2014.

(51) Int. Cl.
*B23K 11/16* (2006.01)
*B23K 11/00* (2006.01)
(Continued)

(52) U.S. Cl.
CPC .......... *B23K 11/163* (2013.01); *B23K 11/002* (2013.01); *B23K 11/11* (2013.01);
(Continued)

(58) Field of Classification Search
CPC ............ B29C 65/3468; B29C 65/4815; B29C 66/73921; B29C 66/02245;
(Continued)

(56) References Cited

U.S. PATENT DOCUMENTS 2,137,909 A * 11/1938 Hagedorn ............... B23K 11/11
219/86.9
2,451,442 A * 10/1948 Meissner ............. B23K 11/002
219/91.2
(Continued)

FOREIGN PATENT DOCUMENTS

CH          512287 A    9/1971
CN         1675019 A    9/2005
(Continued)

*Primary Examiner* — Dana Ross
*Assistant Examiner* — Joe E Mills, Jr.
(74) *Attorney, Agent, or Firm* — Quinn IP Law

(57) ABSTRACT

A resistance spot welding method can be used to join polymeric and metallic workpieces together and includes the following steps: (a) placing an electrically conductive coating between a polymeric workpiece and a metallic workpiece, wherein the metallic workpiece has a textured surface facing the polymeric workpiece; (b) piercing the polymeric workpiece with first and second electrically conductive pins of a welding electrode assembly; (c) applying electrical energy to the first and second electrically conductive pins so that an electrical current flows through the first electrically conductive pin, the electrically conductive coating, and the second electrically conductive pin in order to at least partially melt the polymeric workpiece and the electrically conductive coating, thereby forming a weld pool; and (d) cooling the weld pool to form a solid weld nugget in order to establish a mechanical interface lock between the solid weld nugget and the textured surface.

20 Claims, 3 Drawing Sheets

(51) Int. Cl.
*B23K 11/11* (2006.01)
*B29C 65/34* (2006.01)
*B29C 65/64* (2006.01)
*B23K 103/16* (2006.01)
*B23K 103/00* (2006.01)
*B29C 65/48* (2006.01)
*B29C 65/00* (2006.01)

(52) U.S. Cl.
CPC ............ *B23K 11/16* (2013.01); *B29C 65/346* (2013.01); *B29C 65/3468* (2013.01); *B29C 65/64* (2013.01); *B29C 66/1122* (2013.01); *B29C 66/30322* (2013.01); *B29C 66/41* (2013.01); *B29C 66/742* (2013.01); *B29C 66/83221* (2013.01); *B29C 66/91315* (2013.01); *B23K 2103/172* (2018.08); *B23K 2103/42* (2018.08); *B29C 65/3476* (2013.01); *B29C 65/3488* (2013.01); *B29C 65/3492* (2013.01); *B29C 65/4815* (2013.01); *B29C 65/4855* (2013.01); *B29C 66/026* (2013.01); *B29C 66/0246* (2013.01); *B29C 66/02245* (2013.01); *B29C 66/71* (2013.01); *B29C 66/7212* (2013.01); *B29C 66/7392* (2013.01); *B29C 66/73115* (2013.01); *B29C 66/7422* (2013.01); *B29C 66/7428* (2013.01); *B29C 66/74283* (2013.01); *B29C 66/942* (2013.01)

(58) Field of Classification Search
CPC . B29C 66/7392; B23K 2203/42; B23K 11/20; B23K 2201/34; B23K 2203/18; B23K 2203/06; B23K 2203/12; B29K 2027/06; B29K 2027/18; B29K 2033/12; B29K 2077/00; B29K 2307/04; B29K 2905/00; B29K 2905/12
USPC .......................... 156/273.9; 219/85.15, 86.9
See application file for complete search history.

(56) References Cited

U.S. PATENT DOCUMENTS

| | | | | |
|---|---|---|---|---|
| 3,252,203 A * | 5/1966 | Alberts | ................ | B23K 11/163 219/56.1 |
| 3,614,375 A * | 10/1971 | Becker | ................ | B23K 11/163 219/91.21 |
| 3,993,529 A * | 11/1976 | Farkas | ................ | B29C 35/12 156/380.7 |
| 4,009,362 A * | 2/1977 | Becker | ................ | B23K 11/163 219/92 |
| 4,072,843 A * | 2/1978 | Szabo | ................ | B23K 11/163 219/91.1 |
| RE29,762 E * | 9/1978 | Becker | ................ | B23K 11/163 219/161 |
| 4,855,562 A * | 8/1989 | Hinden | ................ | B23K 35/0288 219/93 |
| 5,187,340 A * | 2/1993 | Machule | ................ | B29C 65/04 156/272.2 |
| 6,497,543 B1 * | 12/2002 | Lyons | ................ | B23K 35/0288 219/98 |
| 6,776,949 B2 * | 8/2004 | Weber | ................ | B29C 65/18 156/245 |
| 7,819,452 B2 * | 10/2010 | Fuchs | ................ | B23K 11/11 156/60 |
| 7,833,630 B2 * | 11/2010 | Sigler | ................ | B23K 11/18 156/73.5 |
| 7,834,292 B2 * | 11/2010 | Wang | ................ | B23K 11/002 156/273.9 |
| 7,951,465 B2 * | 5/2011 | Urushihara | ................ | B23K 11/20 219/136 |
| 8,222,560 B2 * | 7/2012 | Sigler | ................ | B23B 5/166 219/117.1 |
| 8,234,770 B2 * | 8/2012 | Durandet | ................ | B21J 15/025 156/91 |
| 9,440,305 B2 * | 9/2016 | Sigler | ................ | B23K 11/11 |
| 2004/0128016 A1 * | 7/2004 | Stewart | ................ | G05B 19/4099 700/159 |
| 2005/0133483 A1 * | 6/2005 | Hou | ................ | B23K 11/0066 219/118 |
| 2007/0272660 A1 * | 11/2007 | Wang | ................ | B23K 11/0053 219/93 |
| 2008/0041828 A1 * | 2/2008 | Lang | ................ | B23K 11/312 219/119 |
| 2008/0087650 A1 * | 4/2008 | Wang | ................ | B23K 11/002 219/117.1 |
| 2009/0065484 A1 * | 3/2009 | Wang | ................ | B23K 11/115 219/118 |
| 2009/0274889 A1 * | 11/2009 | Iwahashi | ................ | B29C 45/14311 428/312.8 |
| 2009/0291322 A1 * | 11/2009 | Watanabe | ................ | B23K 20/1265 428/653 |
| 2010/0098910 A1 * | 4/2010 | Naritomi | ................ | B32B 7/12 428/141 |
| 2011/0188927 A1 * | 8/2011 | Mizrahi | ................ | B23K 11/115 403/271 |
| 2011/0272384 A1 * | 11/2011 | Matsushita | ................ | B23K 11/115 219/91.2 |
| 2012/0132354 A1 * | 5/2012 | Jaeschke | ................ | B29C 65/1635 156/272.8 |
| 2012/0141829 A1 * | 6/2012 | Oikawa | ................ | B23K 11/115 428/683 |
| 2013/0129409 A1 * | 5/2013 | Cho | ................ | B29C 65/4835 403/266 |
| 2013/0273312 A1 * | 10/2013 | Campbell | ................ | B32B 7/08 428/137 |
| 2013/0273314 A1 * | 10/2013 | Campbell | ................ | B32B 7/08 428/138 |
| 2014/0064830 A1 * | 3/2014 | Nagano | ................ | B29C 66/21 403/270 |
| 2014/0134448 A1 * | 5/2014 | Yamauchi | ................ | C04B 37/026 428/552 |
| 2014/0144889 A1 * | 5/2014 | Sakurai | ................ | B23K 11/115 219/91.2 |
| 2014/0154494 A1 * | 6/2014 | Kato | ................ | B23K 11/115 428/300.7 |
| 2014/0196272 A1 * | 7/2014 | Krajewski | ................ | B21J 15/02 29/525.06 |
| 2014/0199560 A1 * | 7/2014 | Gong | ................ | B22D 19/08 428/615 |
| 2014/0238595 A1 * | 8/2014 | Blohowiak | ................ | C08G 77/58 156/281 |
| 2014/0272436 A1 * | 9/2014 | Akita | ................ | C08J 5/121 428/447 |
| 2014/0283986 A1 * | 9/2014 | Kunichi | ................ | B29C 65/168 156/272.8 |
| 2014/0331478 A1 * | 11/2014 | Dannheisig | ................ | B29C 65/64 29/525.07 |
| 2014/0342954 A1 * | 11/2014 | Ingber | ................ | A61L 29/06 508/100 |
| 2015/0000956 A1 * | 1/2015 | Spinella | ................ | B23K 11/20 174/126.2 |
| 2015/0053328 A1 * | 2/2015 | Wang | ................ | B29C 65/3468 156/92 |
| 2015/0115019 A1 * | 4/2015 | Pascal | ................ | B23K 20/125 228/112.1 |
| 2015/0258624 A1 * | 9/2015 | Draht | ................ | B23K 11/0053 403/267 |
| 2015/0290911 A1 * | 10/2015 | Hirata | ................ | B29C 65/02 156/309.6 |
| 2015/0300389 A1 * | 10/2015 | Mayer | ................ | B29C 65/08 156/73.1 |
| 2016/0167158 A1 * | 6/2016 | Spinella | ................ | B23K 11/3009 403/270 |
| 2016/0325488 A1 * | 11/2016 | Tanaka | ................ | B23K 20/12 |

(56) References Cited

U.S. PATENT DOCUMENTS

FOREIGN PATENT DOCUMENTS

| CN | 1765558 A | 5/2006 |
|----|-----------|--------|
| CN | 102186666 A | 9/2011 |
| DE | 2737692 A1 | 3/1979 |
| JP | S57187185 A | 11/1982 |
| JP | S5942189 A | 3/1984 |

\* cited by examiner

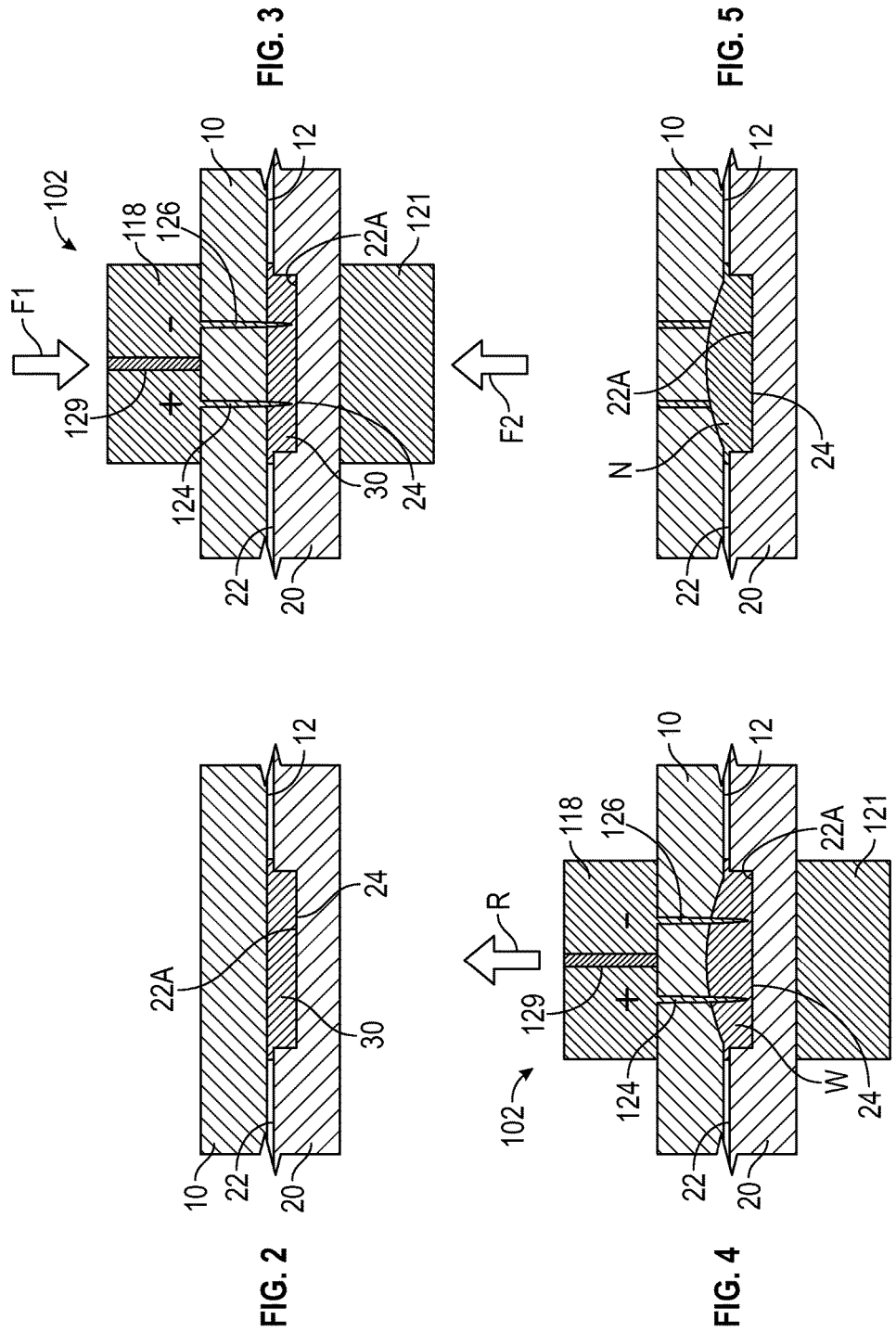

RESISTANCE SPOT WELDING METHOD

CROSS-REFERENCE TO RELATED APPLICATION

This application claims priority to and the benefit of U.S. Provisional Patent Application No. 61/983,655, filed on Apr. 24, 2014, which is hereby incorporated by reference in its entirety.

TECHNICAL FIELD

The present disclosure relates to a resistance spot welding method.

BACKGROUND

Welding is a process for joining two or more workpieces, such as metal substrates. In general, welding may include the application of heat and pressure to at least two workpieces in order to coalesce the workpieces. Numerous welding processes have been developed over the years.

SUMMARY

Resistance spot welding is a type of welding process in which electric current is passed through two electrodes and the workpieces to generate localized heating in the workpieces. The material forming the workpieces melts and coalesces at the interface between the two workpieces, thereby forming a weld pool. The weld pool then cools down to form a weld nugget. To improve the throughput, it is useful to minimize the time it takes to complete a resistance spot welding process. To lighten the structural weights, it is also useful to join workpiece made of dissimilar materials using resistance spot welding. To this end, the presently disclosed resistance spot welding method has been developed.

The presently disclosed resistance spot welding method can be used to join a polymeric workpiece and a metallic workpiece together. In an embodiment, the resistance spot welding method includes the following steps: (a) placing an electrically conductive coating between a polymeric workpiece and a metallic workpiece, wherein the metallic workpiece has a textured surface facing the polymeric workpiece; (b) piercing the polymeric workpiece with first and second electrically conductive pins of a welding electrode assembly; (c) applying electrical energy to the first and second electrically conductive pins so that an electrical current flows through the first electrically conductive pin, the electrically conductive coating, and the second electrically conductive pin in order to at least partially melt the polymeric workpiece and the electrically conductive coating, thereby forming a weld pool (some heating results from the joule heating the metallic workpiece); and (d) cooling the weld pool so as to form a solid weld nugget in order to establish a mechanical interface lock between the solid weld nugget and the textured surface, wherein the mechanical interface lock interconnects the polymeric workpiece to the metallic workpiece. The method additionally includes applying a clamping force to the polymeric workpiece and the metallic workpiece in order to press the polymeric workpiece against the metallic workpiece after placing the electrically conductive coating between the polymeric workpiece and the metallic workpiece.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic, front sectional view of a polymeric workpiece, a metallic workpiece, and an electrically conductive coating between the polymeric and metallic workpieces;

FIG. 3 is a schematic, front sectional view of the polymeric workpiece, the metallic workpiece, the electrically conductive coating shown in FIG. 2, and a welding electrode assembly applying a clamping force to the polymeric and metallic workpieces;

FIG. 4 is a schematic, front sectional view of the polymeric workpiece, the metallic workpiece, the electrically conductive coating, and the welding electrode assembly shown in FIG. 3, wherein the welding electrode assembly is applying electrical energy to the electrically conductive coating;

FIG. 5 is a schematic, front sectional view of the polymeric workpiece, the metallic workpiece, the electrically conductive coating, and the welding electrode assembly shown in FIG. 4, wherein the welding electrode assembly is withdrawn from the polymeric workpiece and a solid weld nugget joins the metallic and polymeric workpieces.

DETAILED DESCRIPTION

Figure 1:
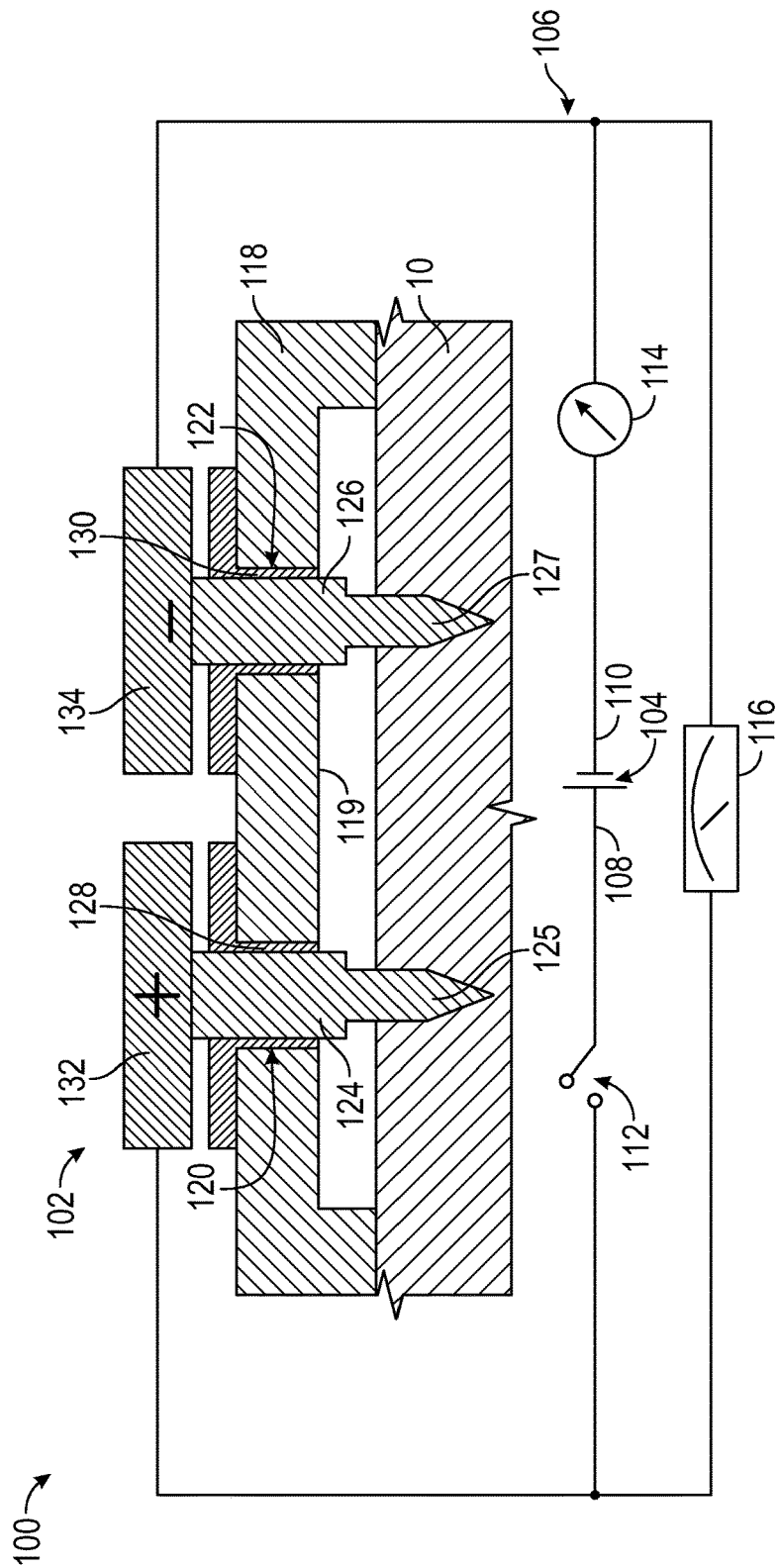
FIG. 1 is a schematic, front sectional view of a welding system.

Referring to the drawings, wherein like reference numbers refer to like components, FIG. 1 schematically illustrates a resistance spot welding system 100 for joining two or more workpieces made of different materials. In the depicted embodiment, the welding system 100 can be used to join a polymeric workpiece 10 and a metallic workpiece 20 (FIG. 3). The polymeric workpiece 10 (FIG. 3) is wholly or partly made of a suitable polymeric composite, such as a fiber-reinforced polymer. As non-limiting examples, suitable polymeric composites include thermoplastic composites having a matrix made of polymethyl methacrylate, polybenzimidazole, polyethylene, polypropylene, polyvinyl chloride, polytetrafluoroethylene, among others. The polymeric workpiece 10 (FIG. 3) can also be wholly or partly made of carbon fiber reinforced nylon compounds. The polymeric composite forming the polymeric workpiece 10 has a melting point ranging from 120 degrees Celsius to 600 degrees Celsius. For example, the polymeric composite forming the polymeric workpieces 10 may have a melting point of about 270 degrees Celsius. As a non-limiting example, the metallic workpiece 20 is wholly or partly made of a ferrous metal, such as steel and stainless steel, or a non-ferrous metal, such as aluminum, titanium, and magnesium.

With continued reference to FIG. 1, the welding system 100 includes a resistance spot welding electrode assembly 102 electrically connected to a power supply 104, such as a direct current (DC) power supply. The welding electrode assembly 102 and the power supply 104 are part of an electrical circuit 106. The power supply 104 includes a positive terminal 108 and a negative terminal 110 and is configured to supply electrical energy to the welding electrode assembly 102. In other words, the power supply 104 can supply an electric current to the welding electrode assembly 102.

In addition to the power supply 104, the electrical circuit 106 includes an electrical switch 112 electrically connected to the power supply 104 in series. The electrical switch 112 can shift between an ON state (or position) and an OFF state (or position). In the ON state, the electrical switch 112 allows electric current to flow through the electrical circuit 106. As such, the electric current can flow from the power supply 104 to the welding electrode assembly 102 when the electrical switch 112 is in the ON state. Conversely, the electrical switch 112 interrupts the flow of electric current from the power supply 104 when it is in the OFF state. Thus, in the OFF state, the electrical switch 112 breaks the electric circuit 106 and, therefore, electric current cannot flow from the power supply 104 to the welding electrode assembly 102.

The welding system 100 additionally includes an ammeter 114 electrically connected to the power supply 104 in series. The ammeter 114 can measure the electric current in the electric circuit 106. It is contemplated that the ammeter 114 may be a moving coil ammeter, an electrodynamic ammeter, a moving iron ammeter, a hot wire ammeter, a digital ammeter, an integrating ammeter or any other type of ammeter suitable to measure the electric current in the electric circuit 106.

The welding system 100 further includes a timer 116 for measuring time intervals. In the depicted embodiment, the timer 116 is electrically connected to the power supply 104 in parallel. The timer 116 can be used to measure and monitor the time that the power supply 104 is supplying electrical current to the welding electrode assembly 102.

Referring to FIGS. 1 and 3, the welding electrode assembly 102 is electrically connected to the power supply 104 and includes a housing 118. The housing 118 defines first and second openings 120, 122 (FIG. 1), which are spaced apart from each other. As non-limiting examples, the first and second openings 120, 122 may be holes or bores and are substantially parallel to each other. The housing 118 may define a housing cavity 119 (FIG. 1).

The welding electrode assembly 102 further includes first and second electrically conductive pins 124, 126 protruding from the housing 118. The first and second electrically conductive pins 124, 126 may be referred to as first and second electrodes, respectively, and each is at least partially disposed inside the housing 118. In the depicted embodiment, the first electrically conductive pin 124 is partially disposed in the first opening 120, and the second electrically conductive pin 126 is partially disposed in the second opening 122. In other words, the first opening 120 partially receives the first electrically conductive pin 124, and the second opening 122 partially receives the second electrically conductive pin 126. The first and second openings 120, 122 are in communication with the housing cavity 119, and the housing cavity 119 partially receives the first and second electrically conductive pins 124, 126. The first and second openings 120, 122 are arranged side-by-side and parallel to each other. Accordingly, the first and second electrically conductive pins 124, 126 are also arranged side-by-side and parallel to each other.

The first and second electrically conductive pins 124, 126 are wholly or partly made of an electrically conductive material, such as a metal, that has a hardness ranging between 50 HRC and 70 HRC in the Rockwell C scale. As a non-limiting example, the harness of the material forming the first and second electrically conductive pins 124, 126 is about 65 HRC in the Rockwell C scale. It is useful that the first and second electrically conductive pins 124, 126 are at least partly made of an electrically conductive material with the hardness and hardness range as described above so that the first and second electrically conductive pins 124, 126 can pierce the polymeric workpiece 10 (FIG. 3). The polymeric workpiece 10 has a hardness ranging between 10 HRC and 50 HRC in the Rockwell C scale in order to allow the first and second electrically conductive pins 124, 126 (with the hardness described above) to pierce the polymeric workpiece 10. As a non-limiting example, the first and second electrically conductive pins 124, 126 may be wholly or partly made of steel. For example, each of the first and second electrically conductive pins 124, 126 may be wholly or partly made of high-speed steel T1, high-speed steel M2, or H-13 tool steel. Further, the first and second electrically conductive pins 124, 126 may be wholly or partly made of tungsten carbide, copper alloy, cobalt alloy steel, tungsten or molybdenum based alloy.

To facilitate piercing the polymeric workpiece 10, each of the first and second electrically conductive pins 124, 126 includes a tapered or pointed tip 125, 127, respectively. The tapered tips 125, 127 may also define a groove to facilitate piercing the polymeric workpiece 10.

The second electrically conductive pin 126 is electrically insulated from the first electrically conductive pin 124. As such, electric current cannot directly flow from the first electrically conductive pin 124 to the second electrically conductive pin 126. To electrically insulate the first and second electrically conductive pins 124, 126 from each other, the welding electrode assembly 102 includes a first electrically insulating cover 128 and a second electrically insulating cover 130. The first and second electrically insulating covers 128, 130 are wholly or partly made of an electrically insulating material, such as a polymer. The first electrically insulating cover 128 is partially disposed in the first opening 120 and at least partially surrounds the first electrically conductive pin 124. Accordingly, the first opening 120 partially receives the first electrically insulating cover 128 and the first electrically conductive pin 124. The second electrically insulating cover 130 is partially disposed in the second opening 122 and at least partially surrounds the second electrically conductive pin 126. Therefore, the second opening 122 partially receives the second electrically insulating cover 130 and the second electrically conductive pin 126. Alternatively or in addition to the first and second electrically insulating covers 128, 130, the welding electrode assembly 102 may include an electrical insulator 129 (FIG. 3) in order to electrically separate the first electrically conductive pin 124 from the second electrically conductive pin 126.

The welding electrode assembly 102 includes a first electrically conductive connector 132 electrically connecting the first electrically conductive pin 124 to the positive terminal 108 of the power supply 104. The electrical switch 112 is electrically connected in series between the positive terminal 108 of the power supply 104 and the first electrically conductive pin 124. Further, the welding electrode assembly 102 includes a second electrically conductive connector 134 electrically connecting the second electrically conductive pin 126 to the negative terminal 110 of the power supply 104. The ammeter 114 is electrically connected in series between the negative terminal 110 of the power supply 104 and the second electrically conductive connector 134.

FIGS. 2-5 schematically illustrate a resistance spot welding method using the welding system 100 described above.

First, in FIG. 2, the method begins by placing an electrically conductive coating 30 between the polymeric workpiece 10 and the metallic workpiece 20. In other words, the electrically conductive coating 30 is placed at the interface between the polymeric workpiece 10 and the metallic workpiece 20 (i.e., the weld interface). No other heating element needs to be placed at the weld interface. The electrically conductive coating 30 is wholly or partly made of an electrically and thermally conductive material. As non-limiting examples, the electrically conductive coating 30 may be carbon black or a thermoplastic material. For example, the electrically conductive coating 30 may be graphite conductive coating, total ground carbon conductive coating, or silver coated copper conductive coating. The metallic workpiece 20 may include a workpiece cavity 24 configured, shaped, and sized to at least partially receive the electrically conductive coating 30. In addition, the polymeric workpiece 10 defines a polymeric faying surface 12, and the second workpiece 20 defines a textured surface 22.

Figure 6:
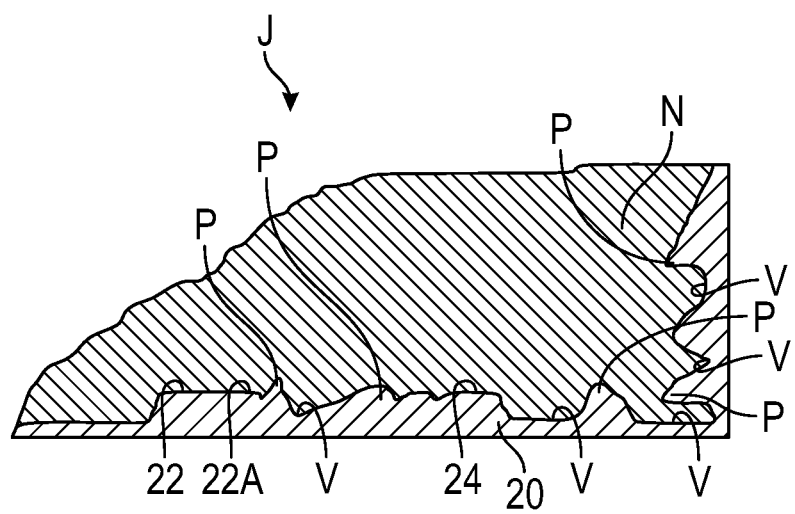
FIG. 6 is a schematic, front sectional view of a welded joint.

With reference to FIG. 6, the textured surface 22 has an arithmetic average roughness $R_a$ ranging between 0.001 micrometers and 2000 micrometers. For instance, the textured surface 22 may have an arithmetic average roughness $R_a$ of about 2 micrometers. The arithmetic average roughness and range described above help establish a mechanical interface lock between the polymeric workpiece 10 and the metallic workpiece 20. To texture the textured surface 22, the metallic workpiece 20 can be subjected to any suitable surface roughening treatment. The surface roughening treatment may be a chemical process, such as lithography, or a mechanical process, such as milling, polishing, blasting, laser treatment, or 3-D printing. A portion 22A of the textured surface 22 defines the workpiece cavity 24. Therefore, the portion 22A of the textured surface 22 that defines the workpiece cavity 24 also has an arithmetic average roughness $R_a$ ranging between 0.001 micrometers and 2000 micrometers in order to help establish a mechanical interface lock between the polymeric workpiece 10 and the metallic workpiece 20. The texture of the textured surface 22 can have a predetermined pattern in order to enhance the mechanical interface lock between the polymeric workpiece 10 and the metallic workpiece 20.

With reference again to FIGS. 2-5, in the step illustrated in FIG. 2, the electrically conductive coating 30 is first placed on the textured surface 22. For example, the electrically conductive coating 30 can be entirely or partially placed on the portion 22A of the textured surface 22 that defines the workpiece cavity 24 so that the electrically conductive coating 30 is at least partially received in the workpiece cavity 24. Then, the polymeric workpiece 10 is placed on top of the electrically conductive coating 30 and the metallic workpiece 20 such that the first faying surface 12 faces the textured surface 22. Thus, the textured surface 22 faces the polymeric workpiece 10. A layer sealer or adhesive is applied between the metallic workpiece 20 and polymeric workpiece 10 to improve the sealing and prevent the corrosion. Then, the method continues to the step illustrated in FIG. 3.

FIG. 3 illustrates a step in which the welding electrode assembly 102 is advanced toward the polymeric workpiece 10 such that the first and second electrically conductive pins 124, 126 pierce the polymeric workpiece 10. In other words, the step illustrated in FIG. 3 entails piercing the polymeric workpiece 10 with the first and second electrically conductive pins 124, 126. Once the first and second electrically conductive pins 124, 126 pierce the polymeric workpiece 10, the welding electrode assembly 102 is advanced in the direction indicated by arrow F1 (i.e., toward the metallic workpiece 20) in order to advance the first and second electrically conductive pins 124, 126 through the polymeric workpiece 10. The first and second electrically conductive pins 124, 126 are simultaneously advanced through the polymeric workpiece 10 in the direction indicated by arrow F1 until the first and second electrically conductive pins 124, 126 contact the electrically conductive coating 30 disposed between the polymeric and metallic workpieces 10, 20. The welding electrode assembly 102 may include a support member 121 (i.e., non-conductive member) capable of supporting the polymeric workpiece 10, the electrically conductive coating 30, and the metallic workpiece 20 while the first and second electrically conductive pins 124, 126 are simultaneously advanced through the polymeric workpiece 10. Thus, the step illustrated in FIG. 3 entails advancing the first and second electrically conductive pins 124, 126 through the polymeric workpiece 10 until the first and second electrically conductive pins 124, 124 contact the electrically conductive coating 30 disposed between the polymeric workpiece 10 and the metallic workpiece 20.

The step shown in FIG. 3 also entails applying pressure (by applying a clamping force in the directions indicated by arrows F1 and F2) to the polymeric workpiece 10 in order to press the polymeric workpiece 10 against the electrically conductive coating 30 and the metallic workpiece 20. In order words, a clamping force is applied to the polymer workpiece 10 and the metallic workpiece 20 in order to press the polymeric workpiece 10 against the metallic workpiece 20. To do so, the welding electrode system 102 is advanced toward the polymeric workpiece 10 and the electrically conductive coating 30 in the direction indicated by arrow F1 until the housing 118 contacts the polymeric workpiece 10. Once the housing 118 contacts the polymeric workpiece 10, the welding electrode assembly 102 is continuously advanced in the direction indicated by arrow F1 in order to press the polymeric workpiece 10 against the electrically conductive coating 30 and the metallic workpiece 20. While the housing 118 moves in the direction indicated by arrow F1, the support member 121 can move in the direction indicated by arrow F2 in order to apply a clamping force to the polymeric workpiece 10 and the metallic workpiece 20. Thus, the housing 118 exerts pressure against the polymeric workpiece 10 in order to clamp the polymeric workpiece 10 against the metallic workpiece 20. The welding electrode assembly 102 can exert pressure on the polymeric workpiece 10 while, at the same time, advancing the first and second electrically conductive pins 124, 126 through the polymeric workpiece 10. Because the welding electrode assembly 102 serves to exert pressure on the polymeric workpiece 10 and the metallic workpiece 20 and to conduct an electric current at the interface between the polymeric workpiece 10 and the metallic workpiece 20, the welding electrode assembly 102 may be referred to as a hybrid welding electrode assembly.

Although the first and second electrically conductive pins 124, 126 advance through the polymeric workpiece 10 when pressured is applied to the polymeric workpiece 10, the first and second electrically conductive pins 124, 126 do not pierce the metallic workpiece 20. The first and second electrically conductive pins 124, 126 are only advanced through the polymeric workpiece 10 in the direction indicated by arrow F1 until the first and second electrically conductive pins 124, 126 contact the electrically conductive coating 30 but before they contact the metallic workpiece 20.

As shown in FIG. 4, once the first and second electrically conductive pins 124, 126 are in contact with the electrically conductive coating 30, electrical energy is applied to the first and second electrically conductive pins 124, 126 so that electrical current (from the power supply 104) flows first to the first electrically conductive pin 124, then through the electrically conductive coating 30, and next through the second electrically conductive pin 126. The power supply 104 supplies electrical energy to the electrically conductive coating 30 (via the first and second electrically conductive pins 124, 126) with sufficient electric current and for enough time to melt the electrically conductive coating 30 and at least part of the polymeric workpiece 10, thereby forming a weld pool W. The weld pool W includes molten polymer (from the polymeric workpiece 10) and molten coating 30. The fillers (to obtain the proper resistivity) used in the coating 30 may strengthen the weld). Because the workpiece 20 has a higher melting point than the polymeric workpiece 10, the metallic workpiece 20 does not melt due to the heat generated while the electric current flows through the electrically conductive coating 30 and metallic workpiece 20. As discussed above, the polymeric workpiece 10 is made of a polymeric composite having a melting point of about 270 degrees Celsius. Thus, a sufficiently high electric current is passed through the electrically conductive coating 30 for a sufficient amount of time in order to heat the polymeric workpiece 10 and the electrically conductive coating 30 at a temperature that is greater than 270 degrees Celsius. The current and time required depend on the resistivity selected. During this heating process, the electrically conductive coating 30 completely melts and only portions of the polymeric workpiece 10 surrounding the electrically conductive coating 30 melt to form the weld pool W. Because the melting point of the metallic material forming the metallic workpiece 20 is greater than 270 degrees Celsius, the metallic workpiece 20 does not melt when the electric current flows through the electrically conductive coating 30. The molten portions of the electrically conductive coating 30 and the polymeric workpiece 10 spread along the textured surface 22 of the metallic workpiece 20 (see FIG. 6).

As shown in FIG. 5, after forming the weld pool W, the first and second electrically conductive pins 124, 126 are withdrawn from the polymeric workpiece 10. To do so, the welding electrode assembly 102 is moved away from the polymeric workpiece 10 in the direction indicated by arrow R (FIG. 4). The weld pool W is initially in a liquid state and is then cooled in order to form a solid weld nugget N that joins the polymeric workpiece 10 and the metallic workpiece 20. In other words, the step shown in FIG. 5 entails cooling the weld pool W until the weld pool W solidifies and forms the solid weld nugget N. The cooling may be through natural conduction. That is, the weld pool W may be allowed to cool down. Regardless of the cooling method, once the weld pool W cools down, it forms a solid weld nugget N that joins the polymeric and metallic workpieces 10, 20.

With reference to FIG. 6, the welded joint J joins the metallic workpiece 20 and the polymeric workpiece 10 and its strength is enhanced by the mechanical interface lock between the solid weld nugget N and the textured surface 22 of the metallic workpiece 20. Because the weld pool W cools down along the textured surface 22, the solid weld nugget N is consequently spread along the peaks P and valleys V of the textured surface 22. The placement of the solid weld nugget N along the peaks P and valleys V of the textured surface 22 establishes a mechanical interface lock between the polymeric workpiece 10 and the metallic workpiece 20 and this mechanical interface lock precludes, or at least hinders, movement of the metallic workpiece 20 relative to the polymeric workpiece 10 in multiple directions. In other words, the welding method includes cooling (through natural convection) the weld pool W so as to form a solid weld nugget N in order to establish a mechanical interface lock between the solid weld nugget N and the textured surface 22, and the mechanical interface lock interconnects the polymeric workpiece 10 to the metallic workpiece 20. The welding method thus includes cooling the weld pool W so as to form a solid weld nugget N in order to establish a mechanical interface lock between the solid weld nugget N and the textured surface 22, and the mechanical interface lock interconnects the polymeric workpiece 10 to the metallic workpiece 20.

While the best modes for carrying out the invention have been described in detail, those familiar with the art to which this invention relates will recognize various alternative designs and embodiments for practicing the invention within the scope of the appended claims.

The invention claimed is:

1. A resistance spot welding method, comprising:
    placing an electrically conductive coating between a polymeric workpiece and a metallic workpiece, wherein the metallic workpiece has a textured surface facing the polymeric workpiece;
    piercing the polymeric workpiece with first and second electrically conductive pins of a welding electrode assembly;
    applying electrical energy to the first and second electrically conductive pins so that an electrical current flows through the first electrically conductive pin, the electrically conductive coating, and the second electrically conductive pin in order to at least partially melt the polymeric workpiece and the electrically conductive coating, thereby forming a weld pool; and
    cooling the weld pool so as to form a solid weld nugget in order to establish a mechanical interface lock between the solid weld nugget and the textured surface, wherein the mechanical interface lock interconnects the polymeric workpiece to the metallic workpiece.

2. The resistance spot welding method of claim 1, wherein the textured surface has an arithmetic average roughness ranging between 0.001 and 2000 micrometers.

3. The resistance spot welding method of claim 1, further comprising applying a clamping force to the polymeric and metallic workpieces in order to press the polymeric workpiece against the electrically conductive coating and the metallic workpiece.

4. The resistance spot welding method of claim 3, further comprising advancing the first and second electrically conductive pins through the polymeric workpiece until the first and second electrically conductive pins contact the electrically conductive coating disposed between the polymeric and metallic workpieces.

5. The resistance spot welding method of claim 1, further comprising withdrawing the first and second electrically conductive pins from the polymeric workpiece after forming the weld pool.

6. The resistance spot welding method of claim 1, wherein the cooling is conducted by natural convection.

7. The resistance spot welding method of claim 1, wherein placing the electrically conductive coating between the polymeric and metallic workpieces includes placing the electrically conductive coating on the textured surface.

8. The resistance spot welding method of claim 7, wherein placing the electrically conductive coating includes placing the electrically conducting coating on a portion of the textured surface that defines a workpiece cavity so that the electrically conductive coating is at least partially disposed in the workpiece cavity.

9. The resistance spot welding method of claim 8, wherein the polymeric workpiece has a melting point of about 270 degrees Celsius, the metallic workpiece has a melting point that is greater than 270 degrees Celsius, and applying electrical energy to the first and second electrically conductive pins includes supplying sufficient electric current to the electrically conductive coating for a sufficient amount of time in order to heat the polymeric workpiece and the electrically conductive coating at a temperature that is greater than 270 degrees Celsius in order to form the weld pool.

10. The resistance spot welding method of claim 1, wherein applying electrical energy to the first and second electrically conductive pins includes supplying sufficient electric current to the electrically conductive coating for a sufficient amount of time in order to completely melt the electrically conductive coating.

11. A resistance spot welding method, comprising:
applying a clamping force to a polymeric workpiece and a metallic workpiece in order to press the polymeric workpiece against the metallic workpiece, wherein the metallic workpiece includes a textured surface facing the polymeric workpiece, and an electrically conductive coating is disposed on the textured surface;
piercing the polymeric workpiece with first and second electrically conductive pins of a welding electrode assembly;
applying electrical energy to the first and second electrically conductive pins so that an electrical current flows through the first electrically conductive pin, the electrically conductive coating, and the second electrically conductive pin in order to at least partially melt the polymeric workpiece and the electrically conductive coating, thereby forming a weld pool; and
cooling the weld pool so as to form a solid weld nugget in order to establish a mechanical interface lock between the solid weld nugget and the textured surface, wherein the mechanical interface lock interconnects the polymeric workpiece to the metallic workpiece.

12. The resistance spot welding method of claim 11, wherein the textured surface has an arithmetic average roughness ranging between 0.001 and 2000 micrometers.

13. The resistance spot welding method of claim 11, wherein applying the clamping force to the polymeric and metallic workpieces includes advancing the welding electrode assembly toward the metallic workpiece.

14. The resistance spot welding method of claim 13, further comprising advancing the first and second electrically conductive pins through the polymeric workpiece until the first and second electrically conductive pins contact the electrically conductive coating disposed between the polymeric and metallic workpieces.

15. The resistance spot welding method of claim 11, further comprising withdrawing the first and second electrically conductive pins from the polymeric workpiece after forming the weld pool.

16. The resistance spot welding method of claim 11, wherein the cooling is conducted by natural convection.

17. The resistance spot welding method of claim 11, wherein the electrically conductive coating is placed between the polymeric and metallic workpieces.

18. The resistance spot welding method of claim 17, further comprising placing the electrically conductive coating on a portion of the textured surface that defines a workpiece cavity so that the electrically conductive coating is at least partially disposed in the workpiece cavity.

19. The resistance spot welding method of claim 11, wherein the polymeric workpiece has a melting point of about 270 degrees Celsius, the metallic workpiece has a melting point that is greater than 270 degrees Celsius, and applying electrical energy to the first and second electrically conductive pins includes supplying sufficient electric current to the electrically conductive coating for a sufficient amount of time in order to heat the polymeric workpiece and the electrically conductive coating at a temperature that is greater than 270 degrees Celsius in order to form the weld pool.

20. The resistance spot welding method of claim 11, wherein applying electrical energy to the first and second electrically conductive pins includes supplying sufficient electric current to the electrically conductive coating for a sufficient amount of time in order to completely melt the electrically conductive coating.

\* \* \* \* \*